United States Patent
Wang

(10) Patent No.: US 11,681,178 B2
(45) Date of Patent: Jun. 20, 2023

(54) LIQUID CRYSTAL DISPLAY PANEL AND MANUFACTURING METHOD THEREOF

(71) Applicant: TCL CHINA STAR OPTOELECTRONICS TECHNOLOGY CO., LTD., Guangdong (CN)

(72) Inventor: Mingyao Wang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 281 days.

(21) Appl. No.: 17/252,309

(22) PCT Filed: Nov. 26, 2020

(86) PCT No.: PCT/CN2020/131824
§ 371 (c)(1),
(2) Date: Dec. 15, 2020

(87) PCT Pub. No.: WO2022/077715
PCT Pub. Date: Apr. 21, 2022

(65) Prior Publication Data
US 2022/0113586 A1    Apr. 14, 2022

(30) Foreign Application Priority Data
Oct. 13, 2020  (CN) .......................... 202011090487.9

(51) Int. Cl.
*G02F 1/1339*  (2006.01)
*G02F 1/1335*  (2006.01)

(52) U.S. Cl.
CPC ...... *G02F 1/133516* (2013.01); *G02F 1/1339* (2013.01); *G02F 1/133512* (2013.01)

(58) Field of Classification Search
None
See application file for complete search history.

(56) References Cited

U.S. PATENT DOCUMENTS

| | | | |
|---|---|---|---|
| 2005/0018124 A1 | 1/2005 | Liao et al. | |
| 2005/0190338 A1* | 9/2005 | Lim ................ | G02F 1/13394 349/156 |
| 2006/0244894 A1* | 11/2006 | Yoon ............... | G02F 1/13394 349/155 |

FOREIGN PATENT DOCUMENTS

| | | |
|---|---|---|
| CN | 102902108 A | 1/2013 |
| CN | 103439836 A | 12/2013 |
| CN | 104049417 A | 9/2014 |
| CN | 108227283 A | 6/2018 |
| CN | 110187569 A | 8/2019 |
| CN | 111190311 A | 5/2020 |

* cited by examiner

*Primary Examiner* — Thanh Nhan P Nguyen
(74) *Attorney, Agent, or Firm* — The Roy Gross Law Firm, LLC; Roy Gross

(57) ABSTRACT

A liquid crystal display panel includes an array substrate and a color filter substrate which are arranged opposite to each other, and a liquid crystal layer. The color filter substrate includes a second substrate, a black matrix, a color resist layer, and photo spacers arranged on a common electrode. The photo spacers are arranged directly under the black matrix. The photo spacer includes a support spacer arranged on the common electrode and a buffer spacer arranged on the support spacer.

13 Claims, 4 Drawing Sheets

LIQUID CRYSTAL DISPLAY PANEL AND MANUFACTURING METHOD THEREOF

FIELD OF DISCLOSURE

The present application relates to a field of display technology, and in particular, to a liquid crystal display panel and a manufacturing method thereof.

DESCRIPTION OF RELATED ART

Liquid crystal displays (LCDs) have been widely used for having many advantages such as being thin, power saving, and no radiation. Generally, a liquid crystal display panel is composed of a color filter (CF) substrate, an array substrate, and liquid crystals (LC) sandwiched between the color filter substrate and the array substrate. Generally, in order to form a certain gap between the array substrate and the color filter substrate for receiving liquid crystals injected into the gap, the color filter substrate is provided with a photo spacer in a final manufacturing step. The photo spacer is a spacer that plays the role of providing in-plane support. The photo spacer needs a certain degree of toughness, which can prevent short-circuiting between indium tin oxide metal layers of the upper and lower plates of an LCD panel and maintain a certain cell gap (thickness) to fill the liquid crystals. At the same time, the photo spacer also needs to have a certain degree of elastoplasticity to ensure that the panel can have certain buffer deformation when subjected to external forces, thereby avoiding permanent damage to semi-finished display panel products (open cell).

At present, the design and calculation of a photo spacer critical dimension (PSCD) and a photo spacer height (PSH) are very critical in designing display panels. By adjusting these two parameters, the photo spacer can provide a sufficient support force and ensure that an LC margin is sufficient to facilitate production; however, in an actual panel production process, some problems related to the photo spacer still cannot be solved perfectly by just adjusting the two parameters.

The first problem is moving Mura effects (uneven displays due to shifting of a panel). The reason is that the upper and lower panels are misaligned after the panel is deformed and squeezed, causing light leakage in an area which was originally shielded by a black matrix, thus seriously affecting the display quality of the panel. The problem of uneven displays resulting from shifting of the panel cannot be solved by just changing PSCD and PSH. Another problem is that when the display panel is affected by vibration, there are light leakage and local uneven dark state displays caused by breakage of a polyimide film in a position corresponding to a top position of the photo spacer. The root cause of this problem is that the photo spacer breaks through the polyimide film. In order to maintain the support strength of the photo spacer, it is not possible to select materials with sufficiently good plasticity. This problem is also difficult to solve/adjust by changing the PSCD.

Accordingly, there arises a need for a liquid crystal display panel and a manufacturing method thereof to solve the above-mentioned problems in conventional liquid crystal display panels. In conventional liquid crystal display panels, since a spacer is a single-layer organic resin material, pixel light leakage or local uneven dark state displays are prone to occur, thus affecting the display quality of the liquid crystal display panel.

SUMMARY

Accordingly, the present application provides the following technical solution.

The present application provides a liquid crystal display panel, comprising an array substrate and a color filter substrate which are arranged opposite to each other, and a liquid crystal layer disposed between the array substrate and the color filter substrate;

wherein the array substrate comprises a first substrate, and a first metal layer, a gate insulating layer, an active layer, a second metal layer, a passivation layer, and a pixel electrode which are sequentially arranged on the first substrate from bottom to top;

the color filter substrate comprises a second substrate, a black matrix and a color resist layer disposed on the second substrate, a common electrode disposed on the black matrix and the color resist layer, and a plurality of photo spacers disposed on the common electrode, wherein the plurality of photo spacers are arranged directly under the black matrix; and the photo spacer comprises a support spacer disposed on the common electrode and a buffer spacer disposed on the support spacer, the support spacer is composed of a first organic resin material, the buffer spacer is composed of a second organic resin material, the first organic resin material has toughness greater than toughness of the second organic resin material, and the first organic resin material has elastoplasticity and a coefficient of friction both lower than elastoplasticity and a coefficient of friction of the second organic resin material.

In the liquid crystal display panel according to one embodiment of the present application, wherein the first metal layer comprises a plurality of scan lines and a plurality of common electrode lines, the second metal layer comprises a plurality of data lines, and the scan lines and the data lines are perpendicular to each other in a horizontal direction to surround a plurality of pixel units.

In the liquid crystal display panel according to one embodiment of the present application, wherein in a position corresponding to each of the pixel units, the color filter substrate is provided with one of the photo spacers.

In the liquid crystal display panel according to one embodiment of the present application, the color resist layer comprises a red color resist layer, a green color resist layer, and a blue color resist layer, and the black matrix is arranged in a spaced-apart manner between any two of the red color resist layer, the green color resist layer, and the blue color resist layer.

In the liquid crystal display panel according to one embodiment of the present application, a surface of the buffer spacer adjacent to the array substrate is in contact with the pixel electrode.

In the liquid crystal display panel according to one embodiment of the present application, the pixel electrode and the common electrode are made of indium tin oxide.

The present application provides a liquid crystal display panel, comprising an array substrate and a color filter substrate which are arranged opposite to each other, and a liquid crystal layer disposed between the array substrate and the color filter substrate;

wherein the array substrate comprises a first substrate, and a first metal layer, a gate insulating layer, an active layer, a second metal layer, a passivation layer, and a pixel electrode which are sequentially arranged on the first substrate from bottom to top;

the color filter substrate comprises a second substrate, a black matrix and a color resist layer disposed on the second substrate, a common electrode disposed on the black matrix and the color resist layer, and a plurality of photo spacers disposed on the common electrode, and the plurality of photo spacers are arranged directly under the black matrix; and the photo spacer comprises a support spacer disposed on the common electrode and a buffer spacer disposed on the support spacer.

In the liquid crystal display panel according to one embodiment of the present application, the support spacer and the buffer spacer are formed by exposure through a same photomask process, and a thickness of the support spacer is greater than a thickness of the buffer spacer.

In the liquid crystal display panel according to one embodiment of the present application, the first metal layer comprises a plurality of scan lines and a plurality of common electrode lines, the second metal layer comprises a plurality of data lines, and the scan lines and the data lines are perpendicular to each other in a horizontal direction to surround a plurality of pixel units.

In the liquid crystal display panel according to one embodiment of the present application, wherein in a position corresponding to each of the pixel units, the color filter substrate is provided with one of the photo spacers.

In the liquid crystal display panel according to one embodiment of the present application, the color resist layer comprises a red color resist layer, a green color resist layer, and a blue color resist layer, and the black matrix is arranged in a spaced-apart manner between any two of the red color resist layer, the green color resist layer, and the blue color resist layer.

In the liquid crystal display panel according to one embodiment of the present application, a surface of the buffer spacer adjacent to the array substrate is in contact with the pixel electrode.

In the liquid crystal display panel according to one embodiment of the present application, the pixel electrode and the common electrode are made of indium tin oxide.

In a manufacturing method of the above-mentioned liquid crystal display panel, wherein the manufacturing method comprises:

S10: sequentially forming a first metal layer, a gate insulating layer, an active layer, a second metal layer, a passivation layer, and a pixel electrode on the first substrate from bottom to top to form an array substrate;

S20: sequentially forming a black matrix, a color resist layer, and a common electrode on a second substrate to form a color filter substrate, wherein the black matrix and the color resist layer are arranged in a same layer on the second substrate, and the common electrode completely cover the black matrix and the color resist layer;

S30: forming a plurality of photo spacers on the common electrode, wherein the photo spacer comprises a support spacer arranged on the common electrode and a buffer spacer arranged on the support spacer; and S40: aligning the array substrate with the color filter substrate, wherein a surface of the buffer spacer adjacent to the array substrate is in contact with the pixel electrode, and a liquid crystal layer is injected between the array substrate and the color filter substrate to form a liquid crystal display panel.

In the manufacturing method of the liquid crystal display panel according to one embodiment of the present application, wherein in S10, the first metal layer comprises a plurality of scan lines and a plurality of common electrode lines, and the second metal layer comprises a plurality of data lines, and the scan lines and the data lines are perpendicular to each other in a horizontal direction to surround a plurality of pixel units.

In the manufacturing method of the liquid crystal display panel according to one embodiment of the present application, wherein in a position corresponding to each of the pixel units, the color filter substrate is provided with one of the photo spacers.

In the manufacturing method of the liquid crystal display panel according to one embodiment of the present application, wherein in S20, the color resist layer comprises a red color resist layer, a green color resist layer, and a blue color resist layer, and the black matrix is arranged in a spaced-apart manner between any two of the red color resist layer, the green color resist layer, and the blue color resist layer.

In the manufacturing method of the liquid crystal display panel according to one embodiment of the present application, wherein in S30, the support spacer and the buffer spacer are formed by exposure through a same photomask process, and a thickness of the support spacer is greater than a thickness of the buffer spacer.

In the manufacturing method of the liquid crystal display panel according to one embodiment of the present application, wherein in S30, the support spacer is composed of a first organic resin material, the buffer spacer is composed of a second organic resin material, the first organic resin material has toughness greater than toughness of the second organic resin material, and the first organic resin material has elastoplasticity and a coefficient of friction both lower than elastoplasticity and a coefficient of friction of the second organic resin material.

Compared with conventional techniques, the liquid crystal display panel and the manufacturing method thereof provided in the embodiments of the present application design the photo spacers on the color filter substrate to have a double-layer structure, and one side of the photo spacer adjacent to the color filter substrate is made of a organic resin material with great toughness, and another side of the photo spacer adjacent to the array substrate is made of an organic resin material with high elastoplasticity and high friction coefficient, which can effectively avoid pixel light leakage or local uneven dark state displays that occur in conventional liquid crystal display panels. Accordingly, the display quality of the liquid crystal display panel is improved.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

The present invention is directed to solving a problem with conventional liquid crystal display (LCD) panels. The conventional liquid crystal display panel is prone to having pixel leakage or local uneven dark state displays because a spacer in the LCD panel is a single-layer organic resin material, thereby affecting the display quality of the liquid crystal display. The present invention can solve this problem.

Figure 1:
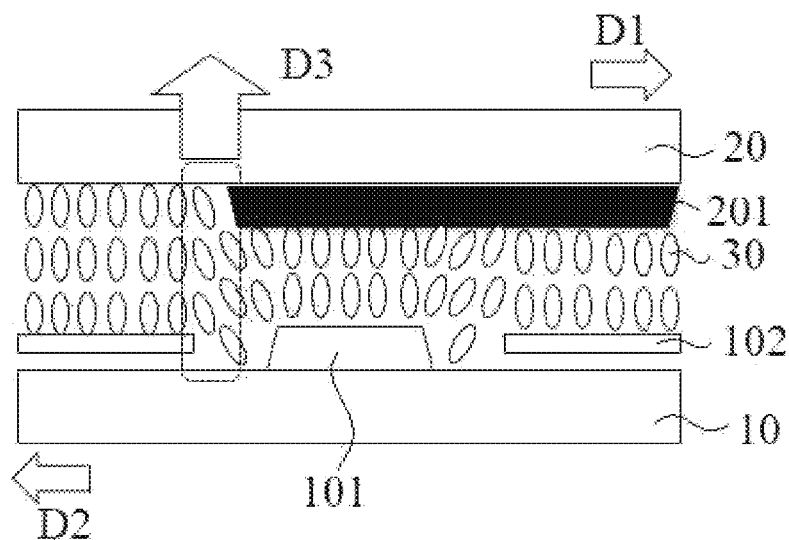
FIG. 1 is a schematic cross-sectional view illustrating shifting and misalignment of upper and lower substrates of a conventional liquid crystal display panel.

As shown in FIG. 1, it is a schematic cross-sectional view showing shifting and misalignment of upper and lower substrates of a conventional liquid crystal display (LCD) panel. Wherein, the LCD panel comprises an array substrate 10 and a color filter substrate 20 arranged opposite to each other, and a liquid crystal layer 30 disposed between the array substrate 10 and the color filter substrate 20. The array substrate 10 comprises a first metal layer 101 and a pixel electrode 102. The first metal layer 101 comprises scan lines and common electrode lines. The color filter substrate 20 comprises a black matrix 201.

Specifically, in a manufacturing process of the conventional LCD panel, the array substrate 10 and the color filter substrate 20 are manufactured separately, and then the array substrate 10 and the color filter substrate 20 are aligned to form a cell.

When the array substrate 10 and the color filter substrate 20 are aligned and formed into a cell, due to the limitation of the alignment accuracy, misalignment is very easy to occur, which makes the array substrate 10 shift along a D1 direction, and the color filter substrate 20 shift along a D2 direction, resulting in light leakage along a D3 direction in an area originally blocked by the black matrix 201, and because a photo spacer is compressed, the photo spacer is unable to return to its original position due to terrains and other reasons after the photo spacer is displaced, resulting in permanent light leakage. In a holistic perspective, this will cause vertical crosstalk (V-crosstalk) in a black-background white-frame display state, which seriously affects the display quality of the panel. The uneven display problem due to shifting of the panel cannot be solved by changing a photo spacer critical dimension (PSCD) and a photo spacer height (PSH).

Figure 2:
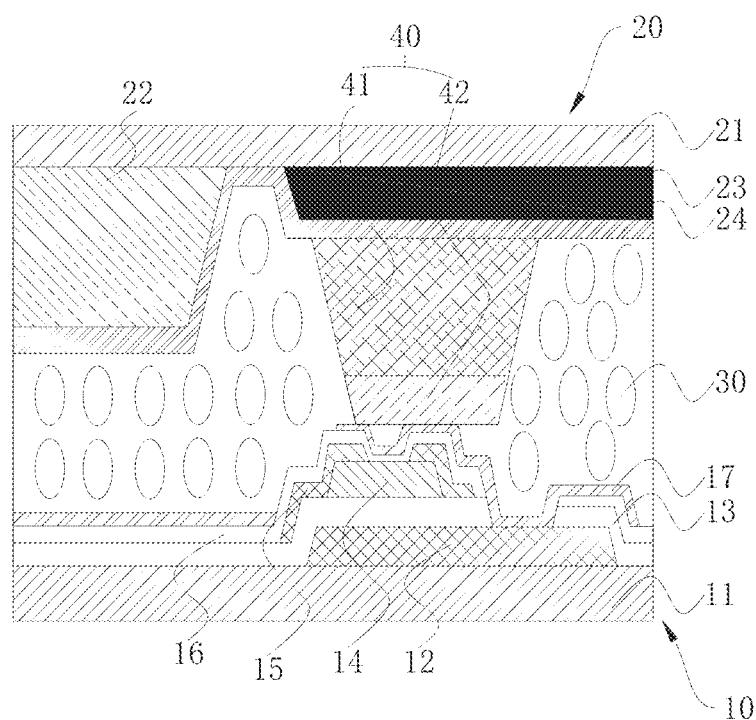
FIG. 2 is a schematic cross-sectional view illustrating a liquid crystal display panel according to one embodiment of the present invention.

Referring to FIG. 2, the present invention provides a liquid crystal display (LCD) panel, which comprises an array substrate 10 and a color filter substrate 20 disposed opposite to each other, and a liquid crystal layer 30 disposed between the array substrate 10 and the color filter substrate 20.

Specifically, the array substrate 10 comprises a first substrate 11, and a first metal layer 12, a gate insulating layer 13, an active layer 14, and a second metal layer 15, a passivation layer 16, and a pixel electrode 17 which are sequentially arranged on the first substrate 11 from bottom to top. The color filter substrate 20 comprises a second substrate 21, a black matrix 23 and a color resist layer 22 disposed on the second substrate 21, a common electrode 24 disposed on the black matrix 23 and the color resist layer 22, and a plurality of photo spacers 40 arranged on the common electrode 24.

The photo spacers 40 are disposed directly under the black matrix 23; the photo spacer 40 include support spacers 41 disposed on the common electrode 24 and a buffer spacer 42 disposed on the support spacer 41, the support spacer 41 is composed of a first organic resin material with good toughness, and the buffer spacer 42 is composed of a second organic resin material with high elastoplasticity and a high coefficient of friction.

In detail, the first organic resin material has toughness greater than toughness of the second organic resin material, and the first organic resin material has elastoplasticity and a coefficient of friction both lower than elastoplasticity and the coefficient of friction of the second organic resin material.

Preferably, the photo spacer 40 is a main spacer photo spacer, and a surface of the buffer spacer 42 close to the array substrate 10 is in contact with the pixel electrode 17, resulting in the photo spacer 40 in a compressed state.

Preferably, the support spacer 41 and the buffer spacer 42 are formed by exposure through a same photomask process, and a thickness of the support spacer 41 is greater than a thickness of the buffer spacer 42. This is more conductive to an original supporting function of the photo spacer 40.

Specifically, both the first substrate 11 and the second substrate 21 are glass substrates.

Specifically, the active layer 14 in the array substrate 10 comprises an amorphous silicon layer and an N-doped amorphous silicon layer arranged on the amorphous silicon layer.

In detail, the first metal layer 12 comprises a plurality of scan lines and a plurality of common electrode lines, the second metal layer 15 comprises a plurality of data lines, and the scan lines and the data lines are perpendicular to each other in a horizontal direction to surround a plurality of pixel units. In a position corresponding to each of the pixel units, the color filter substrate 20 is provided with one of the photo spacers 40.

Further, the color resist layer 22 comprises a red color resist layer, a green color resist layer, and a blue color resist layer. The black matrix 23 is arranged in a spaced-apart manner between any two of the red color resist layer, the green color resist layer, and the blue color resist layer.

Preferably, the pixel electrode 17 and the common electrode 24 are both made of indium tin oxide.

The advantage of the present invention is that the photo spacer 40 adopts a double-layer structure design, the strong and tough photo spacer 41 at the bottom can provide the original supporting function of the photo spacer 40, and the plastic and elastic buffer spacer 42 can provide good buffering and shock absorption effects, thus preventing the photo spacer from breaking through the polyimide layer, and improving the uneven dark state displays of the LCD panel. The buffer spacer 42 has a high coefficient of friction, so the buffer spacer 42 can effectively prevents the upper and lower plates from shifting and misalignment, and a position of the photo spacer 40 is not easy to move, which can effectively improve uneven displays resulting from shifting of the LCD panel.

Figure 3:
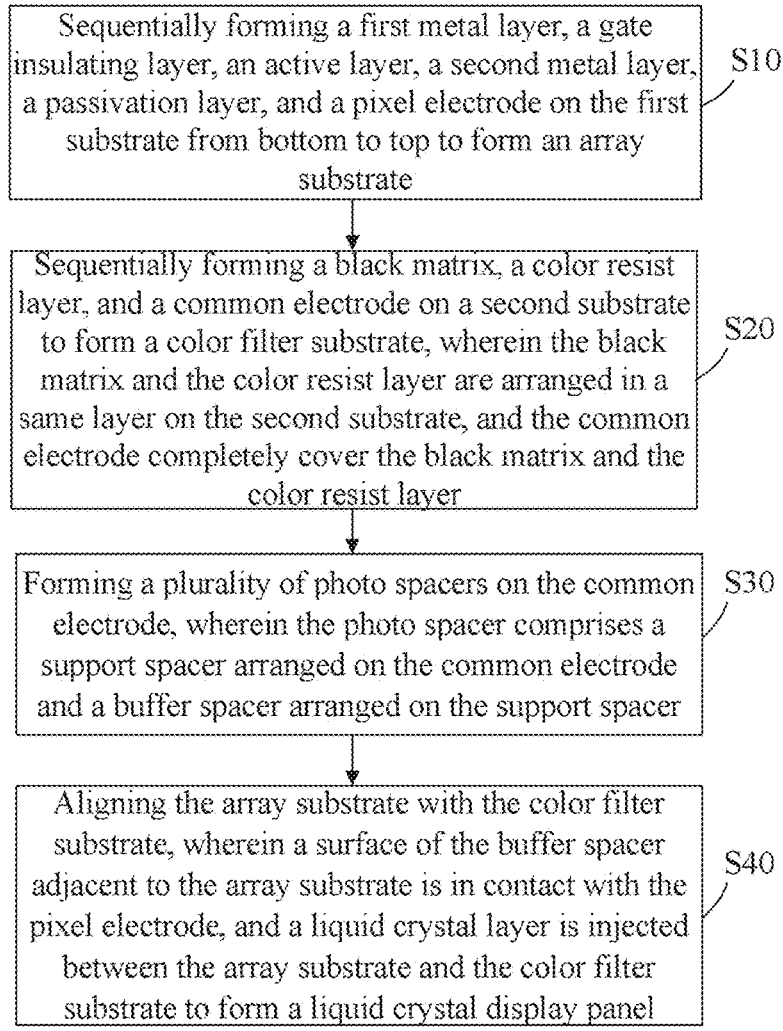
FIG. 3 is a process flow diagram illustrating a manufacturing method of the liquid crystal display panel according to one embodiment of the present invention.

Referring to FIG. 3, it is a process flow diagram illustrating a manufacturing method of a liquid crystal display (LCD) panel, wherein the manufacturing method comprises:

S10: sequentially forming a first metal layer 12, a gate insulating layer 13, an active layer 14, a second metal layer 15, a passivation layer 16, and a pixel electrode 17 on the first substrate 11 from bottom to top to form an array substrate 10.

Figure 4A:
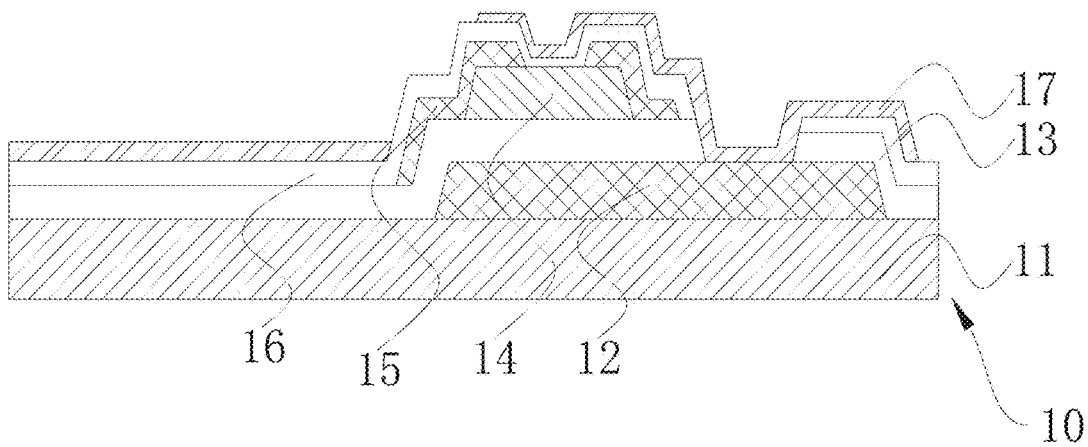
FIGS. 4A to 4D are structural views illustrating the manufacturing method of the liquid crystal display panel according to one embodiment of the present invention.

Specifically, S10 comprises:

First, the first metal layer 12, the gate insulating layer 13, the active layer 14, the second metal layer 15, the passivation layer 16, and the pixel electrode 17 are sequentially formed from bottom to top on the first substrate 11 to form the array substrate 10. Wherein, the first substrate 11 and the second substrate 21 are both glass substrates. The active layer 14 in the array substrate 10 comprises an amorphous silicon layer and an N-doped amorphous silicon layer disposed on the amorphous silicon layer. The first metal layer 12 comprises a plurality of scan lines and a plurality of common electrode lines, and the second metal layer 15 comprises a plurality of data lines. The scan lines and the data lines are perpendicular to each other in a horizontal direction to surround a plurality of pixel units. The pixel electrode 17 is made of indium tin oxide, as shown in FIG. 4A.

S20: sequentially forming a black matrix 23, a color resist layer 22, and a common electrode 24 on a second substrate 21 to form a color filter substrate 20, wherein the black matrix 23 and the color resist layer 22 are arranged in a same layer on the second substrate 20, and the common electrode 24 completely cover the black matrix 23 and the color resist layer 22.

Figure 4B:
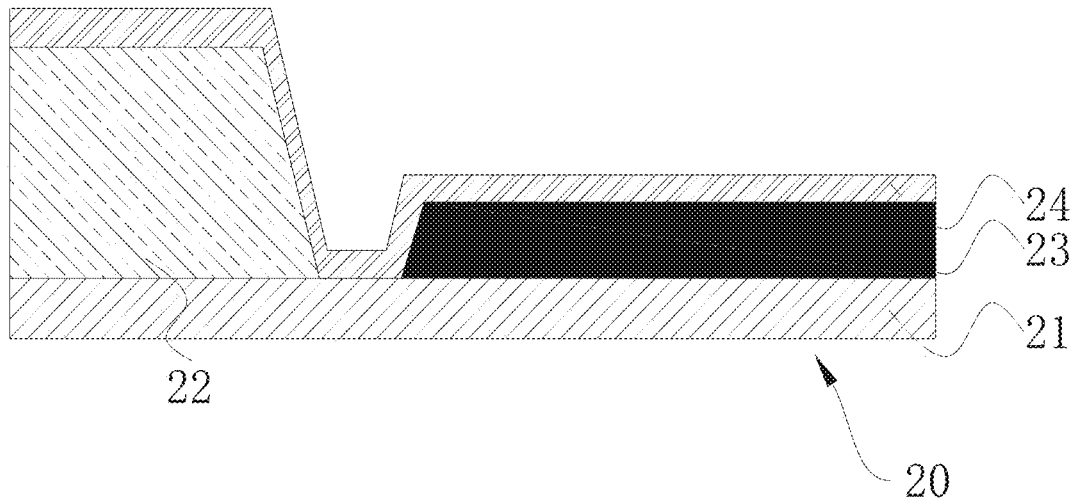

In detail, S20 comprises:

The black matrix 23, the color resist layer 22, and the common electrode 24 are sequentially formed on the second substrate 21 to form the color filter substrate 20, wherein the black matrix 23 and the color resist layer 22 are arranged in the same layer on the second substrate 20, and the common electrode 24 completely cover the black matrix 23 and the color resist layer 22. The color resist layer 22 comprises a red color resist layer, a green color resist layer, and a blue color resist layer, and the black matrix 23 is arranged in a spaced-apart manner between any two of the red color resist layer, the green color resist layer, and the blue color resist layer. The common electrode 24 is made of indium tin oxide, as shown in FIG. 4B.

S30: forming a plurality of photo spacers 40 on the common electrode 24, wherein the photo spacer 40 comprises a support spacer 41 arranged on the common electrode 24 and a buffer spacer 42 arranged on the support spacer 41.

Figure 4C:
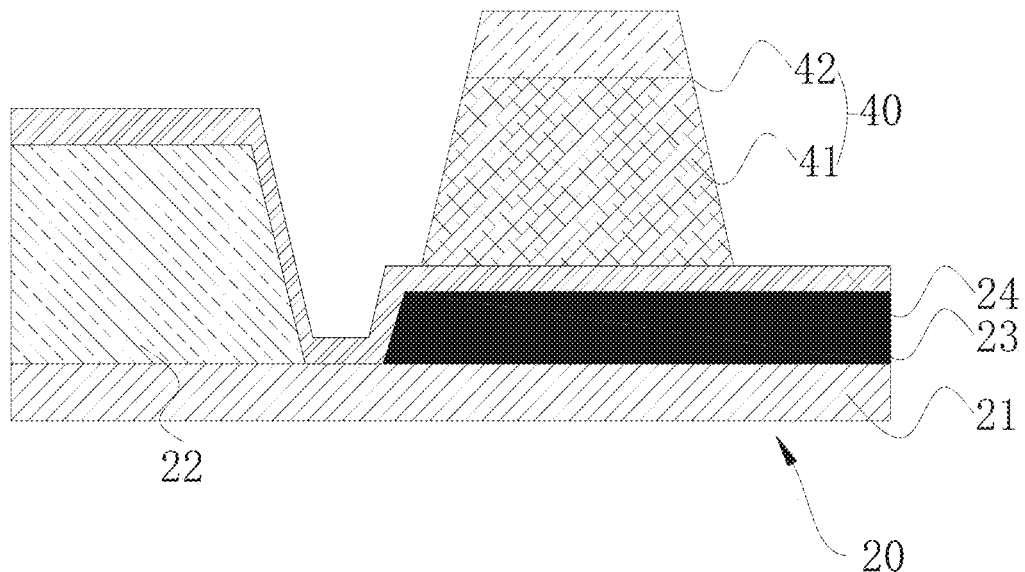

Specifically, the S30 comprises:

First, a layer of a first organic resin material with greater toughness is deposited on the common electrode 24; then, a layer of a second organic resin material with better elastoplasticity and a higher coefficient of friction is deposited on the first organic resin material. Then, photoresists cover the second organic resin material to perform unified exposure to form the two-section photo spacer 40. Wherein, the photo spacers 40 are disposed directly under the black matrix 23. The photo spacer 40 comprise a support spacer 41 disposed on the common electrode 24 and a buffer spacer 42 disposed on the support spacer 41, the support spacer 41 is made of a first organic resin material with great toughness, the buffer spacer 42 is made of a second organic resin material with high elastoplaticity and a high coefficient of friction. The toughness of the first organic resin material is greater than that of the second organic resin material, and elastoplasticity and a coefficient of friction of the first organic resin material are both lower than the elastoplasticity and the coefficient of friction of the second organic resin material, as shown in FIG. 4C.

Preferably, the photo spacer 40 is a main photo spacer, and a surface of the buffer spacer 42 close the array substrate 10 is in contact with the pixel electrode 17, resulting in the photo spacer 40 in a compressed state.

Preferably, the support spacer 41 and the buffer spacer 42 are formed by exposure through a same photomask process, and a thickness of the support spacer 41 is greater than a thickness of the buffer spacer 42. This is more conductive for the photo spacer 40 to provide its original supporting function.

S40: aligning the array substrate 10 with the color filter substrate 20, wherein a surface of the buffer spacer 42 adjacent to the array substrate 10 is in contact with the pixel electrode 17, and a liquid crystal layer 30 is injected between the array substrate 10 and the color filter substrate 20 to form a liquid crystal display panel.

Figure 4D:
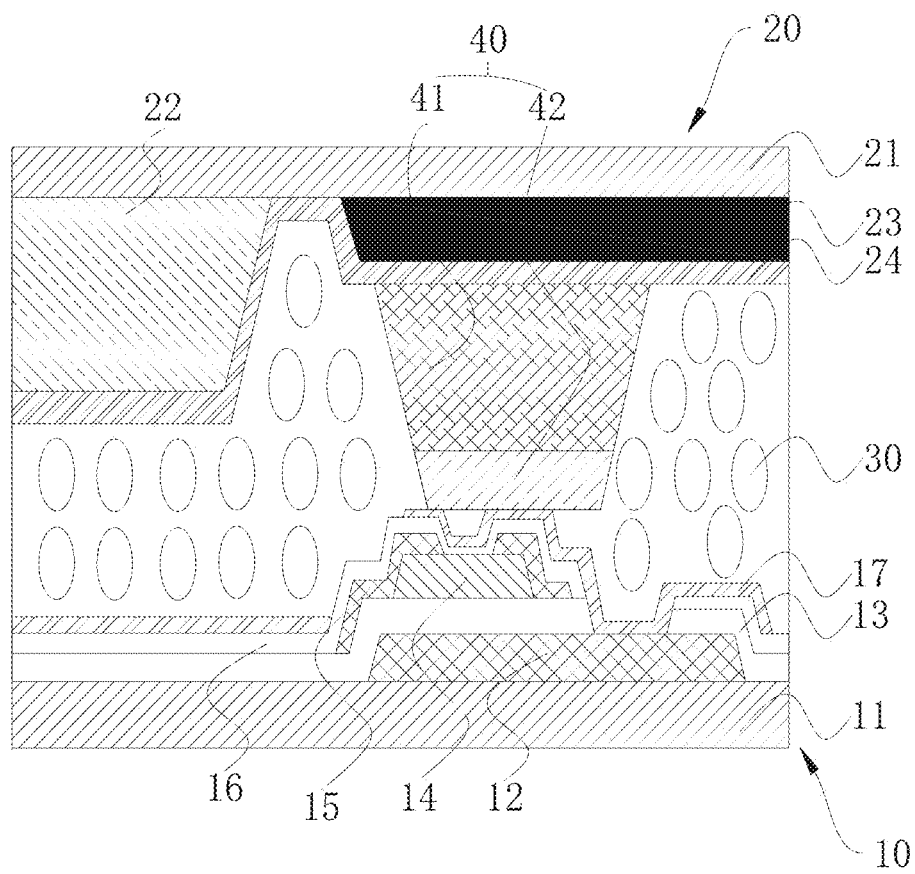

In detail, S40 comprises:

The array substrate 10 and the color filter substrate 20 are aligned, and the surface of the buffer spacer 42 close to the array substrate 10 is in contact with the pixel electrode 17, resulting in the photo spacer 40 in a compressed state. After that, a liquid crystal layer 30 is injected between the array substrate 10 and the color filter substrate 20 to form the liquid crystal display panel, as shown in FIG. 4D.

The advantage of the present invention is that the photo spacer 40 adopts a double-layer structure design, the strong and tough photo spacer 41 at the bottom can provide the original supporting function of the photo spacer 40, and the plastic and elastic buffer spacer 42 can provide good buffering and shock absorption effects, thus preventing the photo spacer from breaking through the polyimide layer, and improving the uneven dark state displays of the LCD panel. The buffer spacer 42 has a high coefficient of friction, so the buffer spacer 42 can effectively prevents the upper and lower plates from shifting and misalignment, and a position of the photo spacer 40 is not easy to move, which can effectively improve uneven displays resulting from shifting of the LCD panel.

Embodiments for the above steps are as the previous embodiments, which will not be repeated here.

In summary, in the liquid crystal display panel and the manufacturing method thereof according to the present application, the photo spacers on the color filter substrate are designed to have a double-layer structure, and one side of the photo spacer adjacent to the color filter substrate is made of the organic resin material with great toughness, and another side of the photo spacer adjacent to the array substrate is made of the organic resin material with high elastoplasticity and high friction coefficient, which can effectively avoid pixel light leakage or local uneven dark state displays that occur in conventional LCD panels. Accordingly, the display quality of the LCD panel is improved.

It can be understood that for those of ordinary skill in the art, equivalent substitutions or changes can be made according to the technical solution and inventive concept of the present application, and all these changes or substitutions should fall within the protection scope of the appended claims of the present application.

In the above-mentioned embodiments, the description of each embodiment has its own emphasis. For those that are not described in detail in one embodiment, reference may be made to related descriptions of other embodiments.

The above describes in detail the liquid crystal display panel and the manufacturing method provided by the embodiments of the present application. Specific examples are used in this disclosure to illustrate the working principles and embodiments of the present application. The description of the above embodiments is only provided for ease of understanding the technical solutions and main ideas of the present application. Those of ordinary skill in the art should understand that modifications or equivalent replacements can be made to the technical solutions of the above embodiments; and such modifications or replacements should be deemed to be within the protection scope of the present application.

What is claimed is:

1. A liquid crystal display panel, comprising an array substrate and a color filter substrate which are arranged opposite to each other, and a liquid crystal layer disposed between the array substrate and the color filter substrate;

wherein the array substrate comprises a first substrate, and a first metal layer, a gate insulating layer, an active layer, a second metal layer, a passivation layer, and a pixel electrode which are sequentially arranged on the first substrate from bottom to top;

the color filter substrate comprises a second substrate, a black matrix and a color resist layer disposed on the second substrate, a common electrode disposed on the black matrix and the color resist layer, and a plurality of photo spacers disposed on the common electrode, wherein the plurality of photo spacers are arranged directly under the black matrix; and the photo spacer comprises a support spacer disposed on the common electrode and a buffer spacer disposed on the support spacer, the support spacer is composed of a first organic resin material, the buffer spacer is composed of a second organic resin material, the first organic resin material has toughness greater than toughness of the second organic resin material, and the first organic resin material has elastoplasticity and a coefficient of friction both lower than elastoplasticity and a coefficient of friction of the second organic resin material.

2. The liquid crystal display panel according to claim 1, wherein the support spacer and the buffer spacer are formed by exposure through a same photomask process, and a thickness of the support spacer is greater than a thickness of the buffer spacer.

3. The liquid crystal display panel according to claim 1, wherein the first metal layer comprises a plurality of scan lines and a plurality of common electrode lines, the second metal layer comprises a plurality of data lines, and the scan lines and the data lines are perpendicular to each other in a horizontal direction to surround a plurality of pixel units.

4. The liquid crystal display panel according to claim 3, wherein in a position corresponding to each of the pixel units, the color filter substrate is provided with one of the photo spacers.

5. The liquid crystal display panel according to claim 1, wherein the color resist layer comprises a red color resist layer, a green color resist layer, and a blue color resist layer, and the black matrix is arranged in a spaced-apart manner between any two of the red color resist layer, the green color resist layer, and the blue color resist layer.

6. The liquid crystal display panel according to claim 1, wherein a surface of the buffer spacer adjacent to the array substrate is in contact with the pixel electrode.

7. The liquid crystal display panel according to claim 6, wherein the pixel electrode and the common electrode are made of indium tin oxide.

8. A manufacturing method of the liquid crystal display panel of claim 1, wherein the manufacturing method comprises:

S10: sequentially forming a first metal layer, a gate insulating layer, an active layer, a second metal layer, a passivation layer, and a pixel electrode on the first substrate from bottom to top to form an array substrate;

S20: sequentially forming a black matrix, a color resist layer, and a common electrode on a second substrate to form a color filter substrate, wherein the black matrix and the color resist layer are arranged in a same layer on the second substrate, and the common electrode completely cover the black matrix and the color resist layer;

S30: forming a plurality of photo spacers on the common electrode, wherein the photo spacer comprises a support spacer arranged on the common electrode and a buffer spacer arranged on the support spacer;

S40: aligning the array substrate with the color filter substrate, wherein a surface of the buffer spacer adjacent to the array substrate is in contact with the pixel electrode, and a liquid crystal layer is injected between the array substrate and the color filter substrate to form a liquid crystal display panel.

9. The manufacturing method of the liquid crystal display panel according to claim 8, wherein in S10, the first metal layer comprises a plurality of scan lines and a plurality of common electrode lines, and the second metal layer comprises a plurality of data lines, and the scan lines and the data lines are perpendicular to each other in a horizontal direction to surround a plurality of pixel units.

10. The manufacturing method of the liquid crystal display panel according to claim 8, wherein in a position corresponding to each of the pixel units, the color filter substrate is provided with one of the photo spacers.

11. The manufacturing method of the liquid crystal display panel according to claim 8, wherein in S20, the color resist layer comprises a red color resist layer, a green color resist layer, and a blue color resist layer, and the black matrix is arranged in a spaced-apart manner between any two of the red color resist layer, the green color resist layer, and the blue color resist layer.

12. The manufacturing method of the liquid crystal display panel according to claim 8, wherein in S30, the support spacer and the buffer spacer are formed by exposure through a same photomask process, and a thickness of the support spacer is greater than a thickness of the buffer spacer.

13. The manufacturing method of the liquid crystal display panel according to claim 8, wherein in S30, the support spacer is composed of a first organic resin material, the buffer spacer is composed of a second organic resin material, the first organic resin material has toughness greater than toughness of the second organic resin material, and the first organic resin material has elastoplasticity and a coefficient of friction both lower than elastoplasticity and a coefficient of friction of the second organic resin material.

\* \* \* \* \*